United States Patent

Pierson

[15] 3,664,175
[45] May 23, 1972

[54] VELOCITY GAUGE
[72] Inventor: William D. Pierson, Albuquerque, N. Mex.
[73] Assignee: Sparton Corporation, Jackson, Mich.
[22] Filed: Apr. 1, 1969
[21] Appl. No.: 811,813

[52] U.S. Cl. ............................................. 73/1 D, 73/517 R
[51] Int. Cl. ........................................................ G01p 15/00
[58] Field of Search ........................................ 73/1, 516, 517

[56] References Cited

UNITED STATES PATENTS 3,153,346  10/1964  Quirmbach, Jr. ......................... 73/497
2,923,904  2/1960  Hieber ..................................... 336/30
2,949,026  8/1960  Gindes et al. .............................. 73/1
3,076,343  2/1963  Dumas et al. ........................... 73/517
3,295,355  1/1967  Fisher et al. ............................... 73/1

Primary Examiner—Richard C. Queisser
Assistant Examiner—Herbert Goldstein
Attorney—Beaman & Beaman

[57]  ABSTRACT

A gauge capable of sensing the velocity at which it is displaced utilizing a pendulous mass dampened within a high viscosity oil, and utilizing polarized electromagnetic deflection means for deflecting the mass for test and calibration purposes.

2 Claims, 6 Drawing Figures

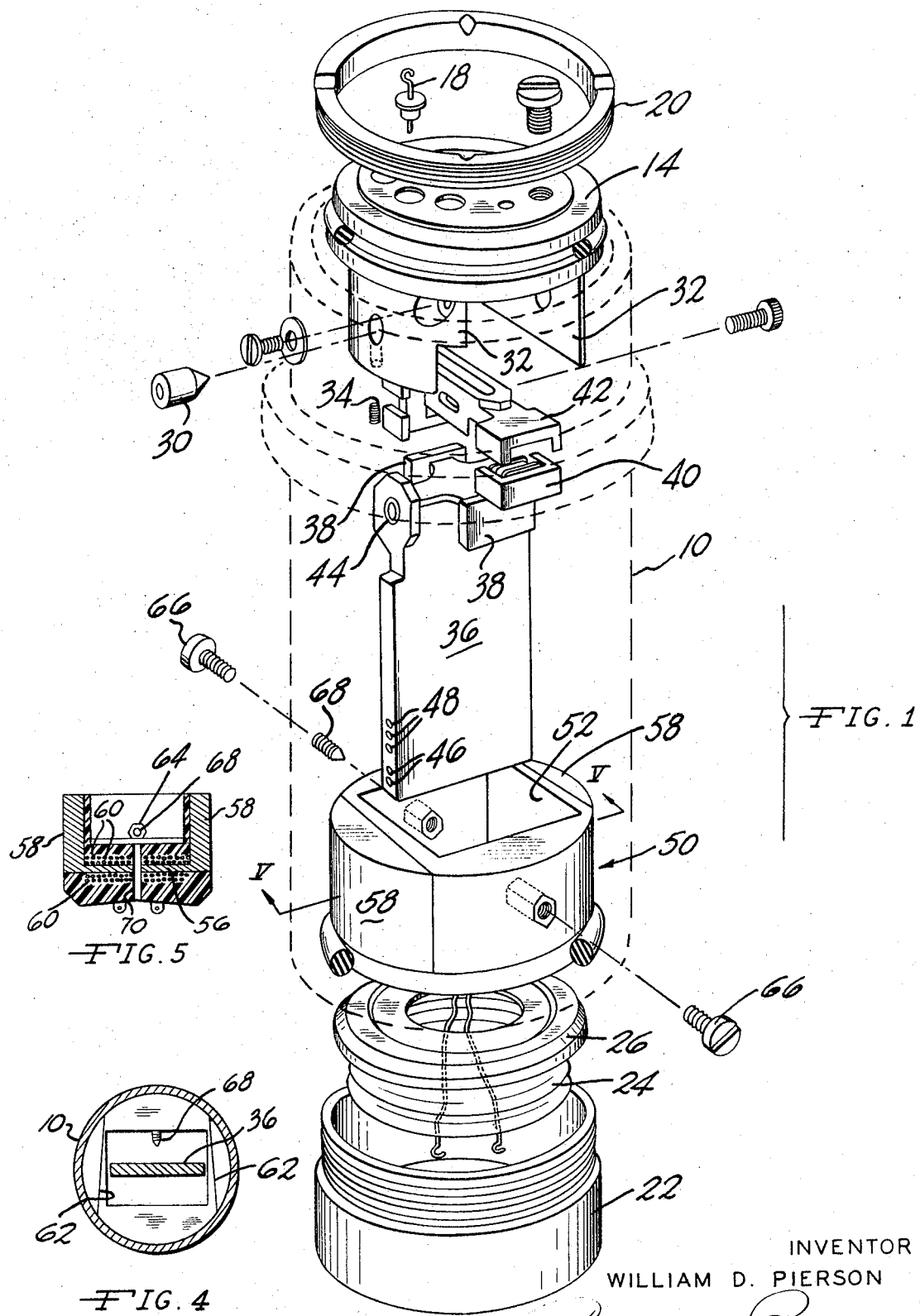

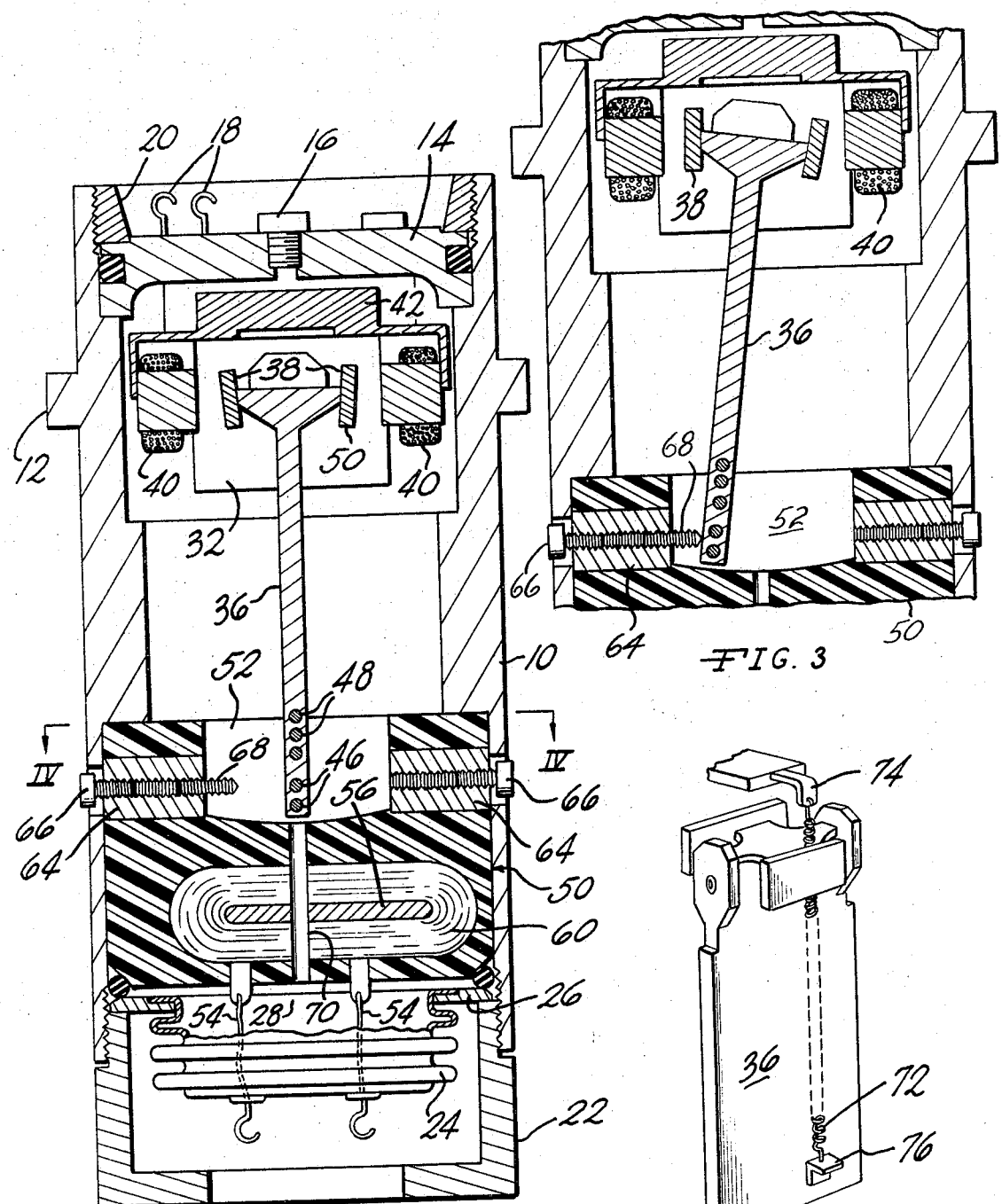

VELOCITY GAUGE

BACKGROUND OF THE INVENTION

The invention pertains to the art of velocity or displacement testing devices wherein a pendulum member is located within a housing, and sensing means are associated with the pendulum to indicate deflection between the pendulum and housing which is proportional to the velocity or other force imposed upon the housing.

Velocity type gauges have been used to sense shock waves traveling through the earth, and the gauge of the invention is particularly suitable, and is commercially employed, for this purpose. In particular, there has been a need for velocity gauges in the testing of the characteristics of subterranean explosions, such as underground nuclear detonations.

In practice, velocity gauges used to sense the characteristics of subterranean explosions are buried at various depths within the ground, and some of the gauges are buried as deep as 400 or 500 feet. The hole in which the gauge is buried is usually backfilled with concrete and grout, and thus the gauges are not accessible once installed. In that it is necessary for a high degree of sensitivity to be achieved in order to produce acceptable testing and evaluating data it is most necessary that accurate calibration of the gauges prior to their actual use be accomplished. With a pendulum type gauge it is usually necessary to dampen the movement of the pendulous mass in order to produce optimum signal characteristics, and the viscosity of the dampening liquid will vary with the temperature thereof. Thus, although the velocity gauges may be very accurately calibrated for a given temperature, the temperature of the gauge once installed, may vary from that of the calibration environment. While it is possible to estimate the approximate temperature at which the gauge will exist during installation and operation, it is not practical to accurately determine this temperature, and this temperature will vary according to the depth at which the gauge is located. In the past, gauges were calibrated at a temperature which would be approximately that at which the gauge would operate. However, the actual temperature of the gauge in operation usually varies from that at which it was calibrated and inaccuracies result in the test data obtained.

It is known in the accelerometer art to incorporate self-testing or deflection devices in a gauge. However, the prior art devices are of a relatively complex nature which do not lend themselves to the aforedescribed type of usage, and the state of the prior art is represented by U.S. Pats. Nos. 3,277,725 and 3,295,355.

SUMMARY OF THE INVENTION

It is an object of the invention to provide a velocity gauge which may be buried in the ground, or located at an inaccessible location, whereby the gauge may be tested and calibrated while in operating situ in order to obtain the most accurate output characteristics.

It is the purpose of the invention to provide a simplified construction for a velocity gauge using a sensing pendulous mass wherein electromagnetic forces are used to deflect the mass for test purposes, and the degree of deflection may be very accurately controlled. The magnetic forces imposed upon the pendulum are directly applied thereto and are polarized to deflect the pendulum in a given direction, and the mass distribution on the pendulum is such as to provide optimum deflection and sensing characteristics. For instance, in the preferred embodiment the pendulum is formed of a lightweight material, such as aluminum, and includes magnetic sensitive inserts adjacent its lower end wherein the higher density of the pendulum is located at that portion swinging through the greatest degree of movement. Additionally, the mass of the pendulum adjacent the free lower end thereof can be further increased by the use of inserts of high density material, such as lead.

It is a further object of the invention to provide a velocity gauge employing a pendulous mass wherein the oscillation of the mass is sensed by a change of impedance between an armature mounted on the pendulum, and a coil located adjacent the armature and fixed with respect to the pendulum axis.

Another object of the invention is to provide a velocity gauge which employs a pendulous mass surrounded by a viscous dampening liquid, and expansion means are used in conjunction with the liquid in order to produce substantially uniform pressure conditions within the gauge at different temperatures, and to minimize variations in pendulum oscillation characteristics due to temperature variation.

BRIEF DESCRIPTION OF THE DRAWING

The aforementioned objects of the invention will be appreciated from the following description and accompanying drawings wherein:

FIG. 1 is an exploded, perspective view of a velocity gauge constructed in accord with the invention, FIG. 2 is an elevational, diametrical, sectional view taken through the velocity gauge, FIG. 3 is a detail, sectional view of the pendulum associated structure illustrating the pendulum being deflected from its normal at rest condition to its maximum testing condition, FIG. 4 is a plan sectional view taken along Section IV—IV of FIG. 2, FIG. 5 is an elevational, sectional view of the magnetic core assembly taken along Section V—V of FIG. 1, and FIG. 6 illustrates a modification of construction which may be utilized with the gauge when the gauge is to be horizontally mounted and the pendulum is horizontally disposed.

DESCRIPTION OF THE PREFERRED EMBODIMENTS

The velocity gauge includes an outer housing or casing 10 which may be of a cylindrical configuration. The casing includes an annular rib 12 for mounting purposes, and in use, the entire casing will be embedded within suitable support structure within the hole or other location in which it is to be located during use.

The casing 10 is internally threaded at its upper portion, and sealed by a cap 14 having an opening plugged by screw 16 and electrical terminals 18 pass through liquid-tight connections. The cap 14 is maintained in position by the annular nut 20 cooperating with the threads defined on the casing.

The lower portion of the casing is provided with internal threads for receiving an annular sleeve cap 22 which houses a bellows 24 of an accordian-type formed of a flexible material mounted within a plate 26 bearing against the upper end of the sleeve. An opening 28 is defined in the plate 26 whereby the interior of the bellows 24 is exposed to the interior of the casing 10.

A pivot axis for a pendulous mass 36 is defined adjacent the casing upper region by a pair of pivot members 30 received in extensions 32 extending from the cap 14. The pivots 30 are fixed in place by set screws 34. The pendulum 36 includes a pair of armatures 38 mounted upon radially extending extensions defined on the pendulum. It will be noted that the armatures 38 are located adjacent the pivot axis and are inclined at about 5° to the vertical, and the armatures will thus move in a circular path upon deflection and oscillation of the pendulum. The armatures 38 are formed of a ferrous material capable of producing an inductance variation when used with its associated coil.

The armature coils 40 are mounted upon brackets 42 affixed to the underside of the cap 14 wherein the core of the coils are radially disposed adjacent a pendulum mounted armature 38. Electrical conductors, not shown, are attached to the coils 40 and extend to the cap terminals 18.

The pendulum 36 is preferably formed of a lightweight material, such as aluminum, and is of a plate configuration including bearings 44 at the upper region for permitting support of the pendulum upon the pivots 30. The lower region of the pendulum must include a material having a magnetic characteristic for attraction by the testing or "cocking" coil, and when the pendulum is made of aluminum, holes are drilled in the lower region of the pendulum for receiving inserts 46 of a magnetic material. Also, in that it is desired that the center of mass of the pendulum be located adjacent the lower regions of the pendulum, holes may be drilled within the pendulum for receiving high density material inserts 48, such as lead, to increase the weight of the pendulum adjacent the lower end thereof.

Deflection of the pendulum 36 for testing purposes is produced by an electromagnetic testing or "cocking" coil assembly generally indicated at 50 and located within the casing 10. The coil 50 includes a rectangular recess 52 receiving the lower portion of the pendulum and windings in the coil assembly produce the electromagnetic force for deflecting the pendulum for test purposes. The coil 50 is energized through conductors 54 extending through the bellows 24 to terminals which are connected to conductors extending to the testing and control equipment.

The core assembly 50 includes a steel U-shaped field piece having a base 56 and upstanding legs 58. The base 56 is wound with wire 60 which connects to the conductors 54. The legs 58 are disposed on the lateral sides of the pendulum 36 and include inner surfaces 62 which are nonparallel and converge toward a stop screw, FIG. 4, as will be later described. The wire 60 is embedded in a potting compound, such as urethane, and this compound extends upwardly to define the recess 52, and give the assembly 50 a cylindrical peripheral configuration.

The upstanding portions of the coil assembly 50 in line with the direction of movement of the pendulum are provided with inserts 64 for receiving screws 66 and a stop screw 68 adapted to engage the pendulum lower end when deflected for testing purposes. By removing the left screw 66 the screw 68 may be rotated whereby the location of the inner end thereof with respect to the pendulum can be varied and thus it is possible to very closely adjust the amount of "swing" produced by the pendulum under test conditions.

In order to dampen the pendulum movement, and yet provide accurate movement of the pendulum which may be accurately measured, the portion of the casing in which the pendulum is mounted is filled with a high viscosity oil such as a silicone oil having a viscosity variation of approximately 1 percent per ° F. Of course, any dampening liquid will expand or contract as its temperature varies, and as the liquid in the casing will communicate with the bellows 24 through the core assembly passage 70 expansion and contraction of the dampening liquid will be compensated for by the bellows.

In operation, the velocity gauge will be buried in a hole adjacent the explosion site, or at a position rather remote therefrom, depending upon the test specifications. In the usual mode of installation the velocity gauge will be mounted in a vertical manner such that the pendulum 36 will assume a normal orientation as that shown in FIG. 2, and the plane of the pendulum, and its axis, will be disposed substantially perpendicular to the direction from which the shock waves will be received.

Once the velocity gauge has been located in position, and connected by conductors to the testing equipment, the velocity gauge will assume the temperature of its surrounding environment. After sufficient time after installation has passed to permit the velocity gauge to assume the temperature of its environment, calibration in situ may be accomplished. Such calibration is achieved by energizing the coil assembly 50, which will deflect the pendulum 36 toward the stop screws 68. Deflection of the pendulum toward the stop screw 68 is assured due to the polarization achieved by the use of the nonparallel surfaces 62. In that the air gap between the magnetic inserts 46 decreases toward the stop screw 68, the magnetic force in the recess 52 will always move the pendulum in the proper direction toward the stop screw.

This deflection will permit the pendulum to be drawn into engagement with the end of the stop screw 68. Thereupon, the coil assembly 50 is deenergized, permitting the pendulum to swing back into its normal, at rest, position. As the pendulum is swinging back towards its normal position the movement of the armatures 38 with respect to the coils 40 is sensed and recorded by the recording equipment connected to the coils, and the time required for the pendulum to move through its desired arc, at the viscosity conditions under which the gauge will be subjected during operation, permits the gauge to be very accurately calibrated.

In that the pendulum directly engages the stop screw 68, and as the armatures 38 are directly mounted upon the pendulum, the apparatus is of a relatively simple construction yet permits very accurate calibration and operation signals to be produced.

In some instances it is desired to mount the velocity gauge in a horizontal manner such that the pendulum 36 would be disposed in a horizontal plane. With this type of installation the embodiment of FIGS. 1 through 3 would not be able to accurately record velocities imposed upon the gauge in view of the influence of gravity on the pendulum. To overcome the effect of gravitational forces in a horizontal installation, a counterbalance spring 72 is employed. The spring 72 is affixed to an anchor 74 attached to the cap 14, FIG. 4. A spring anchor 76 is affixed to the pendulum free end. The "offset" relationship of the spring anchors 74 and 76 permits the spring to extend around the armature 38 on the same pendulum side and the spring holds the pendulum in a substantially horizontal position, yet the pendulum will be permitted to move up and down under influence of the testing produced by the energization of the coil assembly 50, or under the influence of deflection produced by forces being opposed upon the gauge casing.

It is appreciated that various modifications to the inventive concept may be apparent to those skilled in the art without departing from the spirit and scope thereof, and it is intended that the invention be defined only by the scope of the following claims.

We claim:

1. A velocity sensing device comprising, in combination, a casing, pendulum pivot means mounted within said casing defining a pivot axis, a pendulum within said casing supported upon said pivot means having a null position, said pendulum including an oscillatable pendulous mass portion, electrical sensing means within said casing sensing oscillation of said pendulum comprising a pair of armatures mounted on said pendulum adjacent said pivot axis and on opposite sides of said pendulum and an electric inductance coil mounted within said casing adjacent each of said armatures, an electromagnetic coil within said casing disposed adjacent said pendulum mass portion, magnetic means upon said mass portion whereby energizing of said coil displaces said mass portion from said null position, and a pendulum stop mounted within said casing remotely spaced from the pendulum null position, said pendulum stop adapted to engage said pendulum mass portion upon said portion being displaced toward said stop upon energization of said coil to provide predetermined pendulum movement upon deenergizing said coil for permitting calibration of said device.

2. A velocity sensing device comprising, in combination, a casing, pendulum pivot means mounted within said casing defining a pivot axis, a pendulum within said casing supported upon said pivot means having a null position, said pendulum including an oscillatable pendulous mass portion, electrical sensing means within said casing sensing oscillation of said pendulum, an electromagnetic coil within said casing disposed adjacent said pendulum mass portion, magnetic means upon said mass portion whereby energizing of said coil displaces said mass portion from said null position, and a single pendulum stop mounted within said casing remotely spaced from the pendulum null position, said pendulum stop adapted to engage said pendulum mass portion upon said portion being displaced toward said stop upon energization of said coil to provide predetermined pendulum movement upon deenergizing said coil for permitting calibration of said device, said electromagnetic coil being polarized to deflect said pendulum mass portion toward said stop, said electromagnetic coil polarization including surface portions disposed adjacent the lateral sides of said pendulum mass portion, said surface portions being nonparallel and converging in the direction toward said pendulum stop.

* * * * *